APPARATUS FOR DISPLAYING MAGNETICALLY STORED DATA

Filed July 14, 1949 7 Sheets-Sheet 1

INVENTOR
JOHN J. CONNOLLY.
BY W. F. Presson
ATTORNEY

April 29, 1952 J. J. CONNOLLY 2,594,731

APPARATUS FOR DISPLAYING MAGNETICALLY STORED DATA

Filed July 14, 1949 7 Sheets-Sheet 2

INVENTOR
JOHN J. CONNOLLY.
BY [signature]
ATTORNEY

April 29, 1952 J. J. CONNOLLY 2,594,731

APPARATUS FOR DISPLAYING MAGNETICALLY STORED DATA

Filed July 14, 1949 7 Sheets-Sheet 3

INVENTOR
JOHN J. CONNOLLY.
BY [signature]
ATTORNEY

April 29, 1952 J. J. CONNOLLY 2,594,731

APPARATUS FOR DISPLAYING MAGNETICALLY STORED DATA

Filed July 14, 1949 7 Sheets-Sheet 4

INVENTOR
JOHN J. CONNOLLY
BY [signature]
ATTORNEY

April 29, 1952 J. J. CONNOLLY 2,594,731

APPARATUS FOR DISPLAYING MAGNETICALLY STORED DATA

Filed July 14, 1949 7 Sheets-Sheet 5

INVENTOR
JOHN J. CONNOLLY.
BY [signature]
ATTORNEY

April 29, 1952 J. J. CONNOLLY 2,594,731

APPARATUS FOR DISPLAYING MAGNETICALLY STORED DATA

Filed July 14, 1949 7 Sheets-Sheet 6

INVENTOR
JOHN J. CONNOLLY.
BY [signature]
ATTORNEY

April 29, 1952 J. J. CONNOLLY 2,594,731

APPARATUS FOR DISPLAYING MAGNETICALLY STORED DATA

Filed July 14, 1949 7 Sheets-Sheet 7

INVENTOR
JOHN J. CONNOLLY.
BY [signature]
ATTORNEY

Patented Apr. 29, 1952

2,594,731

UNITED STATES PATENT OFFICE 2,594,731

APPARATUS FOR DISPLAYING MAGNETICALLY STORED DATA

John J. Connolly, New York, N. Y., assignor to The Teleregister Corporation, New York, N. Y., a corporation of Delaware Application July 14, 1949, Serial No. 104,791

16 Claims. (Cl. 177—337)

Figures 1, 8A, 8B, 8C:
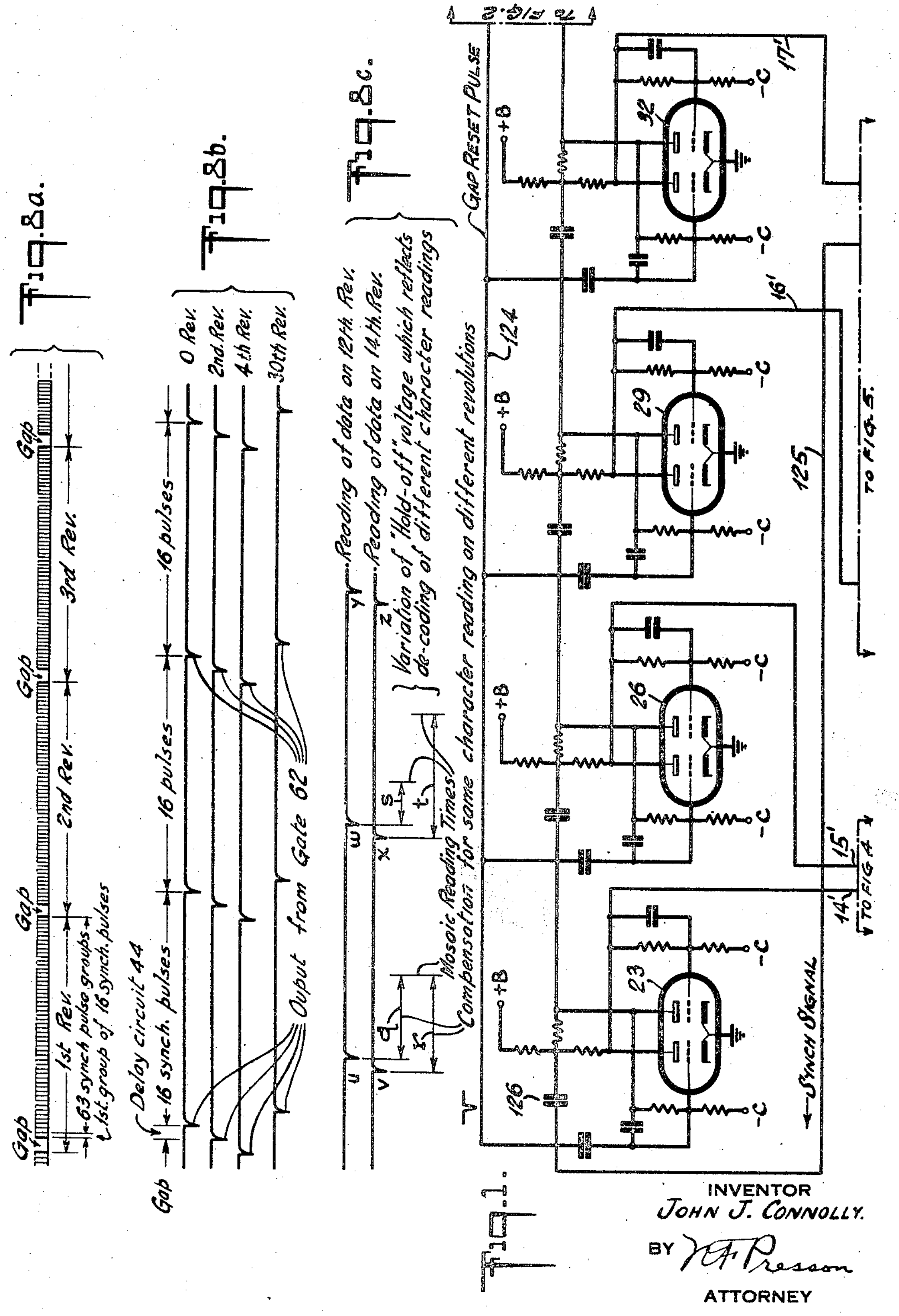

This invention relates to rotary magnetic data storage systems in combination with systems for the manifestation of stored data. There are numerous applications of statistical storage systems. Magnetic data storage has been found extremely convenient for the temporary storage of constantly changing statistical items. A magnetic recording on different tracks of a continuously rotatable storage member lends itself to a scanning operation whereby all of the changes of data items may be brought out instantly for manifestation on suitable display means.

In order to display the magnetically-stored information, various devices have been resorted to in the past, some of which include electro-mechanical display units such as those disclosed in the application of H. F. May, Serial No. 73,201, filed January 27, 1949, now Patent No. 2,564,403, August 14, 1951, while other devices have been of the class herein disclosed. I prefer to utilize the technique of character display which portrays characters on the screen of one or more cathode ray tubes.

In systems which provide storage for a large number of statistical items, it is often desirable to make a continuous display of characters corresponding to the stored items. One application of such a system would be a stock quotation board where the constantly changing market prices of different stocks are to be displayed during intervals between changes. Another application would be an air traffic control system. The necessary data for flight plans of different aircraft would be recorded and made manifest at a central station in accordance with the receipt of messages from different points, all directed to a central station for supervisory control of an integrated flight plan. Still another application would be in a system for handling seat reservations for air transport passengers on different scheduled flights.

My invention has numerous objects. Among the more important objects are the following:

1. To provide a data display system which uses cathode ray tubes or the like, for manifesting the significance of stored intelligence.

2. To provide common equipment for the translation of stored intelligence into a display of legible characters, this equipment being composed of a minimum number of components for the simultaneous display of a large number of characters corresponding to what may be stored from time to time in a magnetic data storage system.

3. To provide magnetic data storage equipment in combination with a plurality of magnetic records that are scannable for the purpose of delineating different characters, and also in combination with means for cooperatively associating the reading of an item of coded data with an appropriate scanning of character-display elements along a record track, whereby a plurality of legible manifestations of magnetic recordings may be simultaneously made.

4. To provide a system for magnetic storage and display of statistical data wherein the different data items are recorded in code form on parallel tracks of a continuously rotatable recording member and means for reading such items by a skip-selection process, the process being carried through successive revolutions of the recording member so as to eventually select all of the items and to produce a continuous display of their significance.

5. To provide a system for cadence selection of a train of discrete moments of excitation of a cathode ray tube on the screen of which different characters are to be displayed, this cadence being started at an instant when the first of the elements of a selected mosaic record is scanned from a continuously rotatable record track; the result being to enable a selected character delineation to be made, albeit the mosaic records for other characters are interlaced with the selected mosaic record.

The foregoing and numerous other objects will be made apparent in the following description. This description will be best understood by reference to the accompanying drawings, in which—

Figure 9:
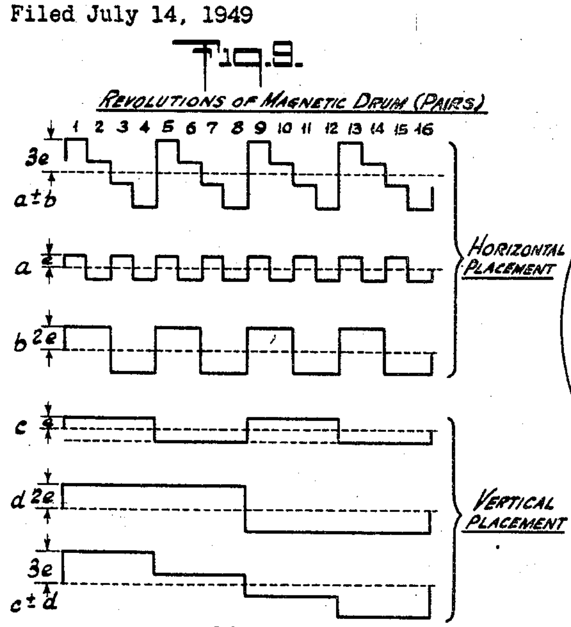
Figure 10:
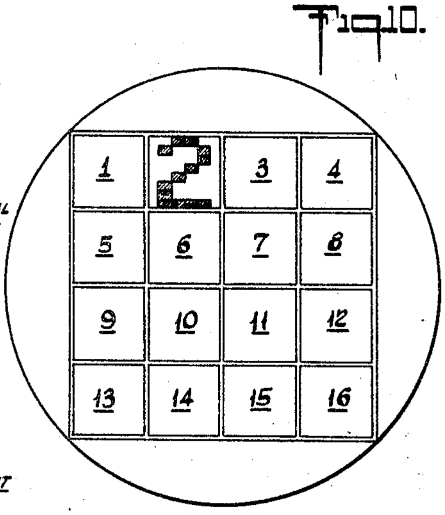
Figures 7, 11:
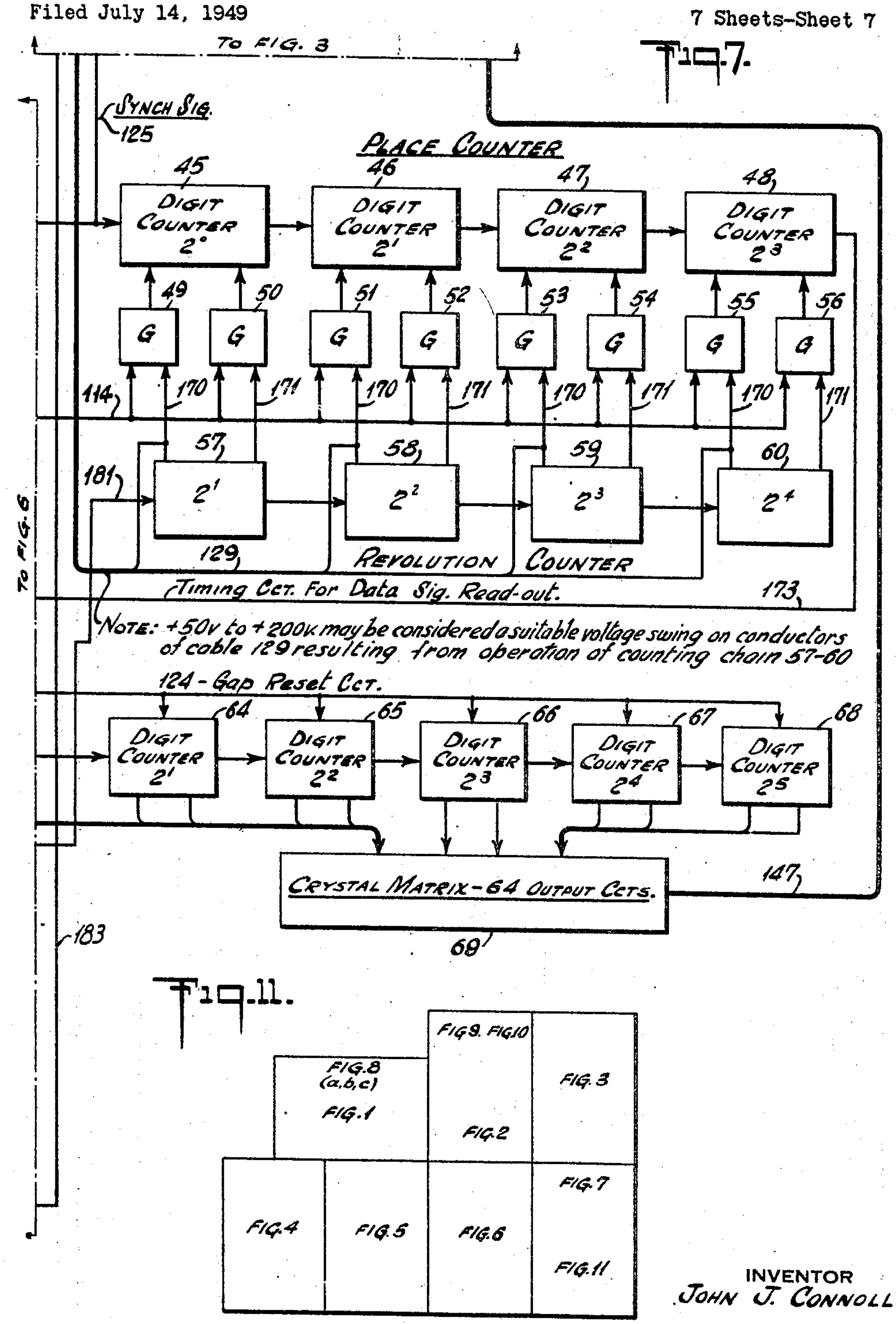

Figs. 1 to 7 inclusive when placed together represent a comprehensive circuit diagram of an illustrative embodiment of my invention;

Figs. 8a, 8b and 8c are charts showing time schedules for various operations of my improved system;

Fig. 9 includes six voltage curves plotted on a time scale to show a program of coordinate placement of character delineations on a cathode ray tube;

Fig. 10 is a front view of a cathode ray tube screen divided into a plurality of rectangular areas for the display of different characters, and Fig. 11 is a plan of arrangement of the seven sheets of drawings which facilitates tracing certain circuits of the circuit diagram from one sheet to another.

*Brief general description*

In this specification only one illustrative embodiment of the invention is shown and described. The invention is by no means limited with respect to the form or to the numbers of parts in different sections of the system. Neither is it necessary to adopt the time schedules which have been indicated. In other words, the spirit of the invention may be followed in the design of apparatus having a wide range of capacity for storing and manifesting statistical items.

The magnetic drum, such as I propose to use, is well known in the art and is usually associated with recording and reading heads so that statistical items may be first impressed magnetically on different assigned spots of each recording track, and the recorded spots are then available for reading when brought past the reading position of different reading heads, one for each record track. On the magnetic drum herein indicated there are six record tracks to be scanned. One of these tracks has permanently recorded thereon a train of magnetized spots which, when scanned, produce synchronizing pulses. Four other tracks are used for the statistical data, this data being recorded in 4-unit code. Each storage point as successively scanned is related to a different item of data. Means are provided for associating each item with a different character display position on a particular one of several cathode ray tubes.

For economy of magnetic storage space a 4-unit code may be used to record the statistical data, provided that the choice of characters to be displayed is restricted to sixteen, say the ten numerals and any six letters. If character selection were to be extended to the full alphabet, it would then be necessary to resort to a 5-unit code. A sixth record track on the magnetic drum is devoted to a recording of magnetic spots which, when scanned by a process of skip-selection, will develop the necessary elements of a mosaic so that any desired character may be displayed on the screen of a cathode ray tube. The skip-selection process, as will be shown hereinafter, is one wherein one of several interlaced mosaic patterns is selected by the gating of reading pulses at regular intervals, and by selectively phasing the start of the gating cadence with respect to the start of scanning the entire record track.

The system herein shown contemplates the use of as many as 64 cathode ray tubes for the display of characters which are stored in as many as 1024 record spots on each of the several record paths for the coded information. Each cathode ray tube will, therefore, have space on its screen for the display of 16 characters, arranged, preferably, in a rectangle having four characters in a row and four rows.

In order to produce a simultaneous display of 1024 characters on the screens of the different cathode ray tubes, and to do this selectively in accordance with the information that is magnetically stored, I preferably employ certain common equipment which is largely electronic in form and which responds to scanning operations along the magnetic storage paths of the magnetic drum so as to bring out all of this data in a succession of revolutions of the drum. In the present embodiment the drum makes 32 revolutions in order to read and manifest all of the data which is stored thereon.

*The reading and recording heads and associated circuits*

Figure 2:
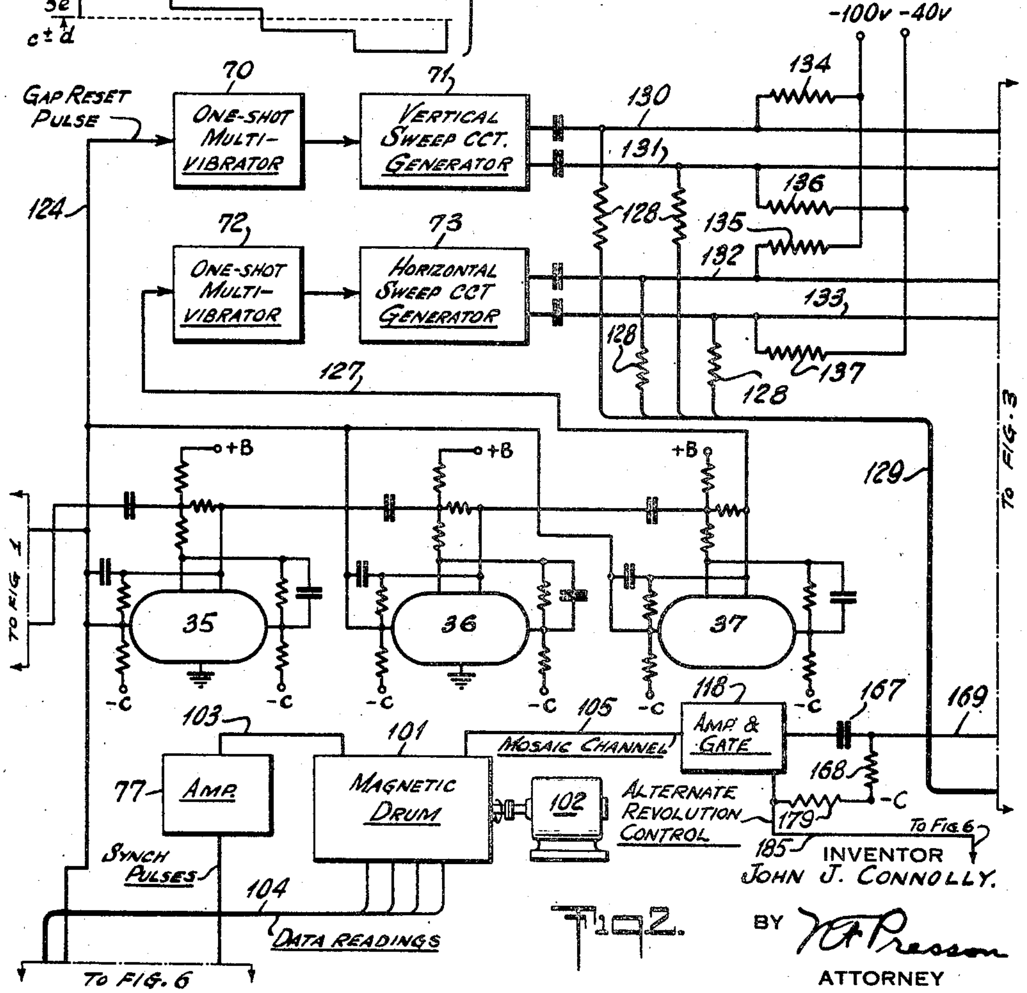

Referring to Fig. 2, I shown therein a block 101 labelled "Magnetic Drum." During service the drum is continuously rotated by means of a motor 102. The drum may be cylindrical in form and have a magnetically coated surface. The recording heads necessary to store information on different tracks, and the reading heads necessary to scan these tracks and to bring out the information are all of a type that is well known in the art, and for this reason no details are herein specified or shown. I have not even shown the essential recording circuits, since it will be well understood that they are to be controlled from any suitable source of information, such as a keyset or a telegraph receiving apparatus.

I do show, however, an output circuit 103 leading away from the magnetic drum 101 and to an amplifier 77. It will be understood that circuit 103 is connected to a reading head which scans a train of evenly spaced magnetized spots for synchronizing purposes.

The four record tracks which are used for data storage are separately scanned by reading heads to which four conductors in cable 104 are connected. The record track which has thereon a system of magnetized spots representing different mosaic blocks patterned for character delineation is scanned by a reading head to which conductor 105 is connected. The mosaic patterns for different characters are interlaced.

*The synchronizing circuit*

The output from amplifier 77 is fed through two capacitors 106 and 107 which are in parallel and which, in the first instance, is carried through a resistor 108 to a source of negative potential marked —C. The output through capacitor 107 is carried through a resistor 109 to a source of negative potential which is marked, for illustration, as —30 v. Potential variations in resistor 108 control the grid in a triode tube 40 in response to the synchronizing pulses. The output from tube 40 is delivered to a so-called "thyratron" tube 41 which is of the gaseous type and is preferably a tetrode. This tube, as will later be brought out, functions to deliver a so-called "Gap Reset Pulse." The synchronizing pulses which are impressed across capacitor 107 and resistor 109 control triode tube 42 which cooperates with another triode tube 43, the circuits of these two tubes being conventionally arranged as a blocking grid oscillator.

It appears unnecessary to describe the circuit components of the tube arrangement including tubes 42 and 43 other than to state that the anode circuit of tube 42 includes one of three windings in a transformer 110. A second winding of this transformer is included in an input circuit for tube 43, and a third winding of transformer 110 is included in the output circuit of this tube. A load resistor 111 is connected in series between the last-named transformer winding and the +B power supply terminal. Utilization of the output from tube 43 is directed into several different components of the system in order to maintain suitable synchronism of operation with respect to the synchronizing pulse train.

*The operational program*

My preferred operational program, according to the instant embodiment, includes the following process steps: (1) scanning the record points along each of the tracks; (2) causing the synchronizing pulses to be counted so that every 16th pulse during alternate drum revolutions shall be effective in producing a read-out of one data code signal; (3) causing the drum revolutions to be counted so as to obtain readings of a different set of data code signals in the first of each pair of successive pairs of drum revolutions; (4) causing a count of synchronizing pulse groups (16 pulses per group) to effect an allocation of data signals to each of 64 cathode ray tubes in succession during every alternate revolution of the drum; (5) causing the revolution counter to effect a placement of character delineations on the screens of said cathode ray tubes in accordance with a coordinate variation of sweep-circuit biases, so that during each second revolution of the revolution pairs the characters delineated on all of the screens will be in the same relative position. Also, during successive second revolutions other characters will be delineated on the 64 screens but in different positions which are the same in each tube, and (6) causing mosaic pattern readings to be selectively applied to different cathode ray tubes, and successive mosaic block signals (black or white) to be applied to each unit area of a character display section on the cathode ray tube screens, making use of conventional horizontal and vertical saw-tooth wave generators.

The sixth process step as enumerated in the preceding paragraph requires a translation of data code signals into "hold-off" periods of variable duration during a previous revolution of the drum. When one of the interlaced mosaic patterns is selected, corresponding to the significance of the data signal, that selection is rendered effective during the drum revolution which follows the revolution devoted to data signal readings. The cadence of application of mosaic block signals while a character-delineating area is being scanned in a given cathode ray tube is such that only the block signals of a selected mosaic pattern will be utilized during one revolution of the magnetic drum. The "hold-off" period starts that cadence at a proper count of 16 synchronizing pulses so that the delineated character shall be a true manifestation of the translated data code signal.

Furthermore, within each of the 64 scanning periods for data signals as covered in a single revolution of the magnetic drum, and as covered by different groups of 16 synchronizing pulses, a different data signal is translated into a suitable "hold-off" period. This translation results in a selection of one of the interlaced mosaic patterns on one revolution and the application thereof to a selected cathode ray tube on the successive revolution. So all the tubes are activated during each second revolution of the magnetic drum.

The character delineation process further requires that the "hold-off" period be varied for each of 16 successive pairs of drum revolutions in order that, when a code signal of certain character significance is read, its position within a 16-synchronizing pulse period shall be compensated for in selecting the proper one of the interlaced mosaic patterns.

From the foregoing a requirement will be observed which has to do with the gating of pulses representing the information that is brought out and decoded, and also the gating of the mosaic pulses. This requirement also involves shifting the phase of the gating cycles so that different parts of the data storage record tracks shall be utilized during successive pairs of revolutions of the drum.

Accordingly, I preferably employ means for phase shifting of the skip-selection process before the start of scanning the data record tracks, and at the commencement of each even-numbered revolution of the magnetic drum. I make use of an electronic counting chain which is operative to count the number of revolutions of the drum up to 32, and then repeat. This counting chain includes a stage 180 (Fig. 6) for binary digit $2^0$ and four following stages 57, 58, 59 and 60, as shown in Fig. 7. These following stages are designated as $2^1$ $2^2$ $2^3$ $2^4$. Each of the five stages is composed of a twin triode tube and associated circuits of conventional design. Stage 180, shown in detail, is typical of the others.

Stage 180 for the binary digit $2^0$ is controlled by negative "gap reset pulses" delivered over conductor 124 and derived from the triggering of tube 41 on each drum revolution before starting to scan the synchronizing pulse train. The output from stage 180 which is delivered over conductor 181 to stage 57 (Fig. 7) of the counting chain causes a count of revolution pairs to be accumulated in this stage and those which follow, namely, stages 58, 59 and 60.

Before proceeding with a description of the revolution counter, which includes counting stages 180 and 57 to 60, it may be well at this point to further explain the operational characteristics of the gap reset pulse generator 41. As was previously stated, this generator is controlled by the output from tube 40 which is a succession of synchronizing pulses. While the pulse train is being scanned, the output from tube 40 is incapable of triggering tube 41 because the pulses are generated so rapidly that their positive and negative half-cycles very largely neutralize one another. During a gap between the end of each synchronizing pulse train and the commencement of scanning it, a sufficiently long interval occurs such that the tube 40 will be blocked and will cause a charge to be built up on capacitor 112. This charge raises the potential on the first grid of tube 41 to a striking voltage. Previous to this moment, that is, during the scanning of the synchronizing pulse train, a charge was built up on capacitor 112a which is in series with resistor 113 between the cathode and anode of tube 41. When tube 41 is ignited, capacitor 112a suddenly discharges through the space path of tube 41 and the consequent lowering of anode potential causes tube 41 to be quickly extinguished. Obviously this operation takes place during the scannig period of the gap in the synchronizing pulse train, and the output of a gap reset pulse signifies the starting point for the scanning of the synchronizing pulse train.

The gap reset pulse is negative and is transmitted through conductor 124 for causing certain flip-flop tubes to be reset to a non-conductive state in their left hand triode sections. The tubes to be reset are 23, 26, 29, 32, 35, 36, 37, 63, 64, 65, 66, 67, 68, 70 and 180.

Except for the magnetic data storage unit substantially all of the common equipment is composed of counting chains, electronic gates and the like. The cycles of operation are variably phased with respect to the gap reset pulse. The revolution counter goes through a cycle, however, which includes 32 of these gap reset pulses, and upon application of each one of the gap reset pulses to flip-flop stage 180 for binary digit $2^0$ each pulse produces a shift of the conductive state from one to the other triode section of the tube. Stage $2^1$ of the counter derives its control from stage $2^0$ and responds only to even numbers of the gap reset pulses. Stage $2^2$ likewise responds only to every fourth one of the gap reset pulses, stage $2^3$ responds only to every eighth of the gap reset pulses, and stage $2^4$ responds only to every sixteenth gap reset pulse. The revolutions are thus counted up to 31 and on the 32nd pulse the entire counting chain registers zero again and recommences the count of revolutions.

One of the uses of the revolution counter is to reset a series of synchronizing pulse digit counters 45, 46, 47 and 48, also arranged in binary counting form. On resetting these counters a certain binary number is stored therein at the outset of scanning the synchronizing pulse train. It has already been stated that the blocking oscillator unit comprising tubes 42 and 43 responds to synchronizing pulses. The binary counting chain 45–48 counts these pulses from the start of scanning the synchronizing pulse track, but extends the pulse count from a certain binary number that is registered in these digit counters during the "gap" period. That binary number is the same as the count of revolution pairs which has been stored in the revolution counter stages 57, 58, 59 and 60.

Interposed between the counting stages 57–60 (which count pairs of revolutions) and the synchronizing pulse counter 45–48 is a series of eight conventional electronic gates 49–56 inclusive. Each of these gates may, if desired, be of the type shown as tube 24 in Fig. 4. Such a gate requires positive potentials to be applied at the same time to two of its grids in order to render it conductive and to transmit a signal through its output circuit. The gates are arranged in pairs, a pair for each digit counter 45, 46, 47 and 48. When the gap reset pulse is delivered through a delay multivibrator 44 to the output conductor 114, it conditions all of the gates 49 to 56 to be conductive. But only one of these gates in each pair is rendered conductive by the output circuits from the associated digit stages 57–60 of the revolution counter.

Conductors 170 should be understood to connect the left hand anode of respective ones of the flip-flop tubes 57–60 to the #3 grids of gates 49, 51, 53 and 55. Conductors 171 make similar connection from the right hand anodes of said flip-flop tubes to the #3 grids of gates 50, 52, 54 and 56. So these #3 grids of either an odd numbered gate or an even numbered gate will stand at a high voltage and will condition the gate for conductance at a time of reception of a positive pulse over conductor 114 from delay multivibrator 44. The other gates will at that time be blocked. Such time is determined as a delay of a few microseconds following the triggering of the gap reset tube 41.

Gates 49–56 when operated in different combinations produce a transfer into the so-called "place counter" of the binary number which is stored in digit stages 57–60 of the revolution counter. Pairs of revolutions are counted by these stages, so the same number is transferred on the first and second scanning of the gap in the synchronizing pulse train and on subsequent pairs of gap scannings. By building up the count of synchronizing pulses in the place counter from whatever setting it receives at gap time, digit stage 48 is triggered one way every alternate eighth pulse and the other way every intervening eighth pulse. So the 16th pulse is that which restores the counter to a reading of 0000, and at the same time an integrated positive pulse is impressed on conductor 173 for opening an electronic gate 62, in order to time the statistical data readings during one drum revolution and the mosaic pattern readings during a following revolution. The effect of the revolution counter on this performance of the place counter is to provide a retrograde phasing of the operation of gate 62 after completing each double revolution scanning of the record tracks on the drum.

*The cathode ray tube*

Figure 3:
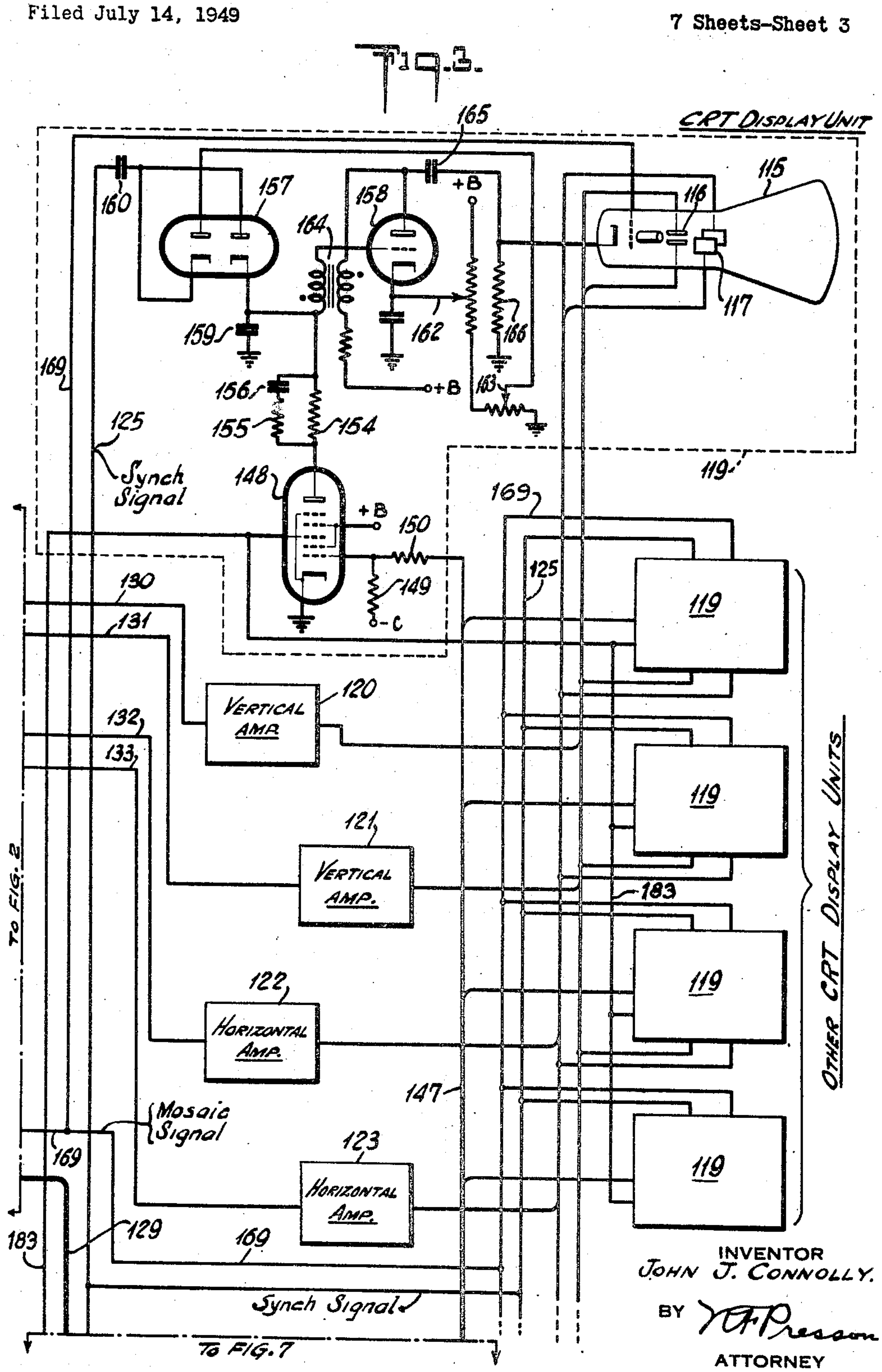

In Fig. 3 I show a cathode ray tube 115 having the usual electrodes, including deflecting electrodes. Vertical and horizontal deflection of the electron beam is obtained by means of electrostatic plates 116 and 117 respectively. The control grid in this tube responds to mosaic signals which are developed as output from one of the reading heads in the magnetic drum 101. Conductor 105 carries the mosaic signals to a gate amplifier 118 and thence through capacitor 167 to a load resistor 168 and to a source of negative bias potential. The output from amplifier 118 serves to control as many cathode ray tubes 115 as may be embodied in the system. Conductor 169 leads from capacitor 167 to the control grids of all the cathode ray tubes. A total of 64 cathode ray tubes is capable of being controlled by the common equipment of the system shown in the instant embodiment of my invention. The circuit arrangement enclosed in broken lines in Fig. 3 will be understood to be duplicated in each of the blocks 119 and as many more as may be needed.

In Fig. 2 I show two sweep circuit generators 71 and 73 which are respectively coupled to amplifiers shown in Fig. 3. The vertical sweep circuit generator 71 has a push-pull output circuit, one side of which is amplified in one of the vertical amplifiers 120, while the other side is amplified in vertical amplifier 121. Likewise, the horizontal sweep circuit generator 73 has a push-pull output circuit, the two sides of which are amplified in horizontal amplifiers 122 and 123. The output circuits of these amplifiers 120 to 123 inclusive, are connected respectively to common busses which lead to the deflecting plates 116 and 117 of all the cathode ray tubes. This arrangement results in the synchronous operation of the deflecting circuits with respect to all of the cathode ray tubes.

Figure 6:
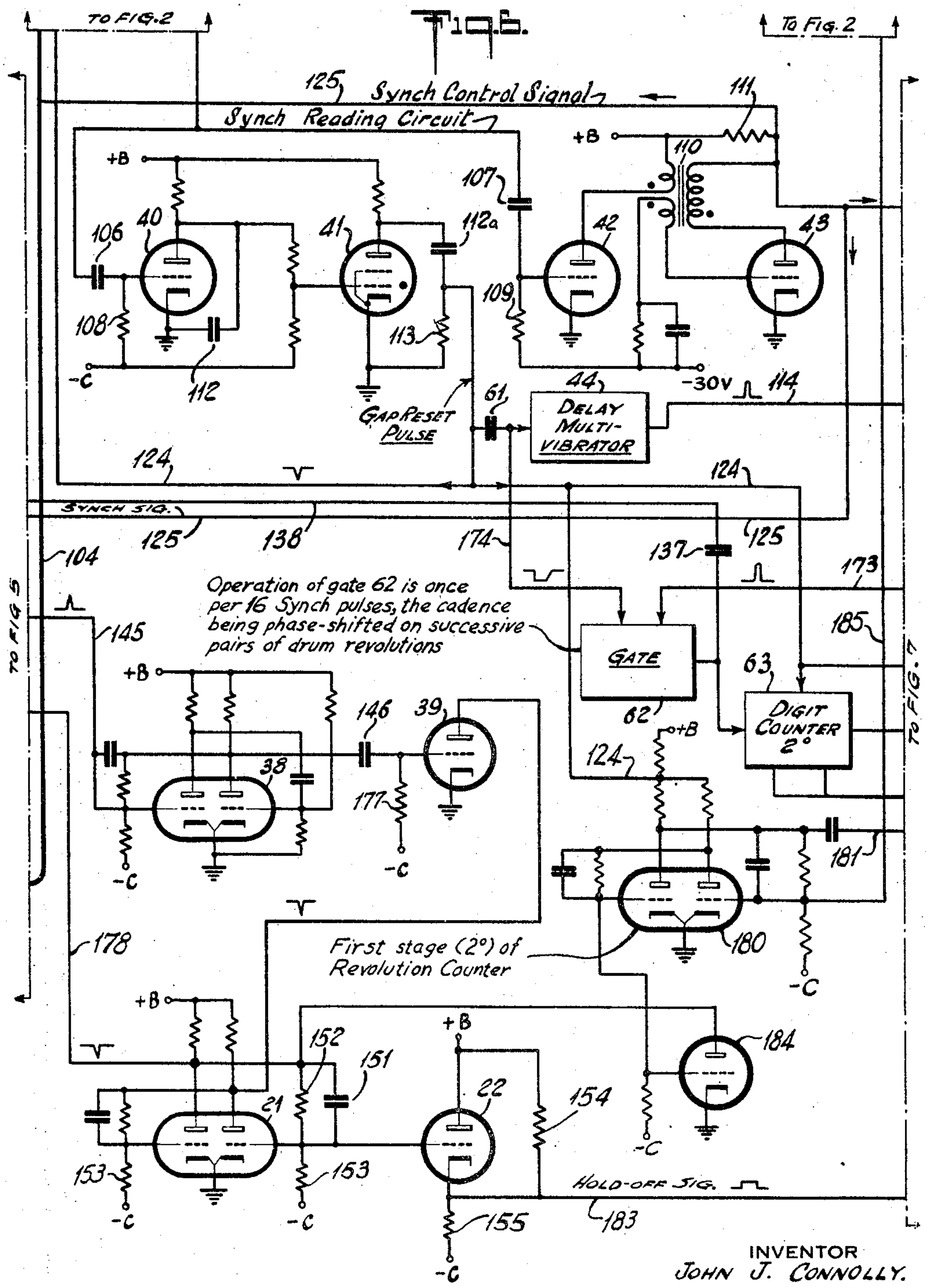

Synchronism of the sweep circuit generators is provided as follows: The vertical sweep is timed to commence with the commencement of the synchronizing pulse train. Therefore, I utilize a one-shot multivibrator 70, the unit input circuit of which is coupled through conductor 124 to the output side of gap reset pulse generator 41 (Fig. 6). The duration of the sweep is substantially commensurate with the complete scanning of the synchronizing pulse train around the drum. The one-shot multivibrator 70 merely initiates the time cycle of the vertical sweep circuit generator 71, and the parameters of this generator are such as to give it the necessary time cycle.

The horizontal sweep circuit generator 73 has a time cycle which extends over a period of 128 synchronizing pulses. This allows the beam to be deflected horizontally 8 times during one vertical sweep. A saw-tooth wave shape is, of course, used for both vertical and horizontal beam deflection. The initiation of each horizontal sweep cycle in the unit 73 is obtained from a one-shot multivibrator 72 whose input circuit is coupled to one of the anodes in a counting chain stage 37 as shown in Fig. 2. This counting chain stage is the 7th of similar stages which include flip-flop tubes 23, 26, 29, 32, 35, 36 and 37. The counting chain which comprises these tubes is arranged to respond to synchronizing signals as derived from output of tube 43 and carried through conductor 125, thence through a capacitor 126 to the junction point between resistors shown in the anode circuits above the twin triode flip-flop tube 23. As is well known in the art, the excitation of this tube 23 in response to synchronizing pulses results in the building up of a count in binary digits, so that when the stage-by-stage operation of the tubes in the chain is effected, tube 37 will be caused to trigger on the 128th pulse. This triggering, therefore, supplies a control pulse through conductor 127 to the input side of the one-shot multivibrator 72. This unit initiates the cyclic operation of the horizontal sweep circuit generator 73. The time cycle of the delivered saw-tooth wave is commensurate with 128 synchronizing pulses, so that 8 cycles are developed during each drum revolution, and 8 horizontal scanning lines are traced on the cathode ray tube screens.

*Placement of characters on different portions of the cathode ray tube screen*

As will be noted by reference to Fig. 2, the output circuits from the sweep circuit generators 71 and 73 have certain resistors 128 connected thereto. These resistors are all in separate conductors of a cable 129 which may be traced from anode circuits on the left side of each of the flip-flop stages 57, 58, 59 and 60. These stages have been heretofore mentioned as constituting a so-called "Revolution Counter." It will be remembered that they count the revolutions of the magnetic drum up to 32 and repeat. One of the effects of this revolution counting is to control the placement of character delineation on each of the cathode ray tubes so that during the odd revolutions the character will be displayed by scanning first, area #1 as shown in Fig. 10. Then on the second and subsequent odd revolutions the areas which are serially numbered will be successively scanned for spreading the mosaic signals thereon. The spread of mosaic signals for display of the numeral "2" is shown in the space which is between areas 1 and 3.

It should be observed at this point that during one revolution of the drum the spreading of the mosaic pattern for delineating a single character is confined to one of the serially numbered areas mentioned in the preceding paragraph. So each character is delineated only once in 32 drum revolutions. Hence it will be apparent to those skilled in the art that one should use cathode ray tubes whose fluorescent screen coating is of a type having long persistence and a very slow decay period. Suitable fluorescent materials of this type are well known in the art and have been used, for example, in radar apparatus.

The binary count which is set up during successive pairs of revolutions of the magnetic drum, and which is represented by the setting of the revolution counter stages 57 to 60 inclusive, operates to shift the bias on each of the output circuits from the sweep circuit generators 71 and 72. These output circuits are now referenced 130 and 131 which are from the vertical sweep circuit generator, and 132 and 133 which are from the horizontal sweep circuit generator. Conductor 130 is connected to a source of fixed bias indicated as −100 v., the connection being through a resistor 134. This same source, −100 v., is connected through resistor 135 to conductor 132. A fixed bias indicated as −40 v. is connected through resistor 136 to conductor 131 and through resistor 137 to conductor 133.

Fig. 9 shows a time schedule for varying the applications of fixed bias to the sweep circuit generator potentials between successive pairs of revolutions of the magnetic drum. Considering first the horizontal placement of the beam deflection for a single character portrayal, it will be noted that the counting stage 57 delivers a positive potential from its left anode during odd counts of the revolution pairs. This potential is applied through one of the resistors 128 to conductor 132 and is in opposition to a negative potential of say, −40 v. applied through resistor 137. For illustrative purposes, let it be assumed that the voltage swing on the said left anode is substantially from +200 v. when the tube section is non-conductive, down to substantially +50 v. when such tube section is conductive. The resultant voltage swing on conductor 133 independently of that which is produced by the sweep circuit generator 73 is indicated as $\pm e$ in curve $a$ as shown in Fig. 9.

The fixed biases applied to conductor 132 will be varied through a range which is substantially twice the range applied to conductor 133. The timing of the voltage shift will be at half the rate because conductor 132 is to be controlled by tube 58 in the revolution counter. Curve $b$ in Fig. 9 represents the variations of fixed bias applied to conductor 132. The uppermost curve in Fig. 9 is labelled $a \pm b$ and represents the resultant of fixed bias potentials to be applied across electrostatic plates 117 in all of the cathode ray tubes 115, it being understood that there is one such tube in each of the units represented by blocks 119.

The fixed biases which are applied to conductors 131 and 130, and which are varied during the cycle of 32 revolutions of the magnetic drum, are represented by curves $c$ and $d$ respectively. The resultant of these fixed biases is represented by the bottom one of the curves in Fig. 9 which is labelled $c \pm d$. The voltage variation of the fixed biases for vertical placement of the scanning action in order to portray a selected character will, of course, have only four steps during a cycle of 32 revolutions because there are only four rows of scanning areas.

During one revolution of the drum the mosaic pattern for a selected character will be read and applied to a particular character block on the screen of the cathode ray tube, as shown in Fig. 10. The scanning action under control of the horizontal and vertical sweep circuit generators is in accordance with conventional practice in respect to the use of oscilloscopes or television picture screens. The chief difference is, according to my invention, that the beam deflection is limited to one of the character areas during a single revolution of the drum so that in each cathode ray tube only one character will be portrayed by the scanning action during a single revolution.

*Timing of the data readings*

Figure 4:
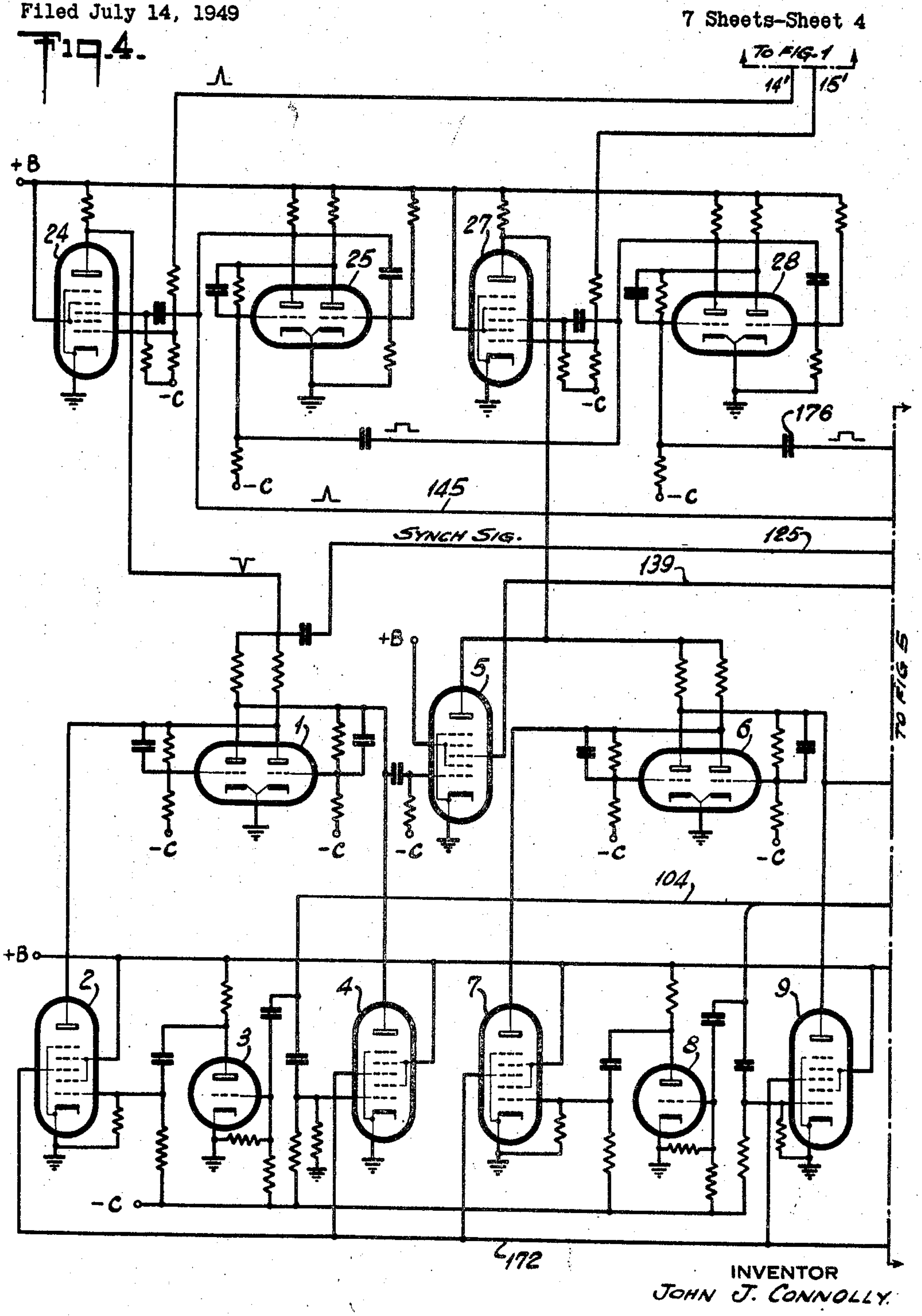
Figure 5:
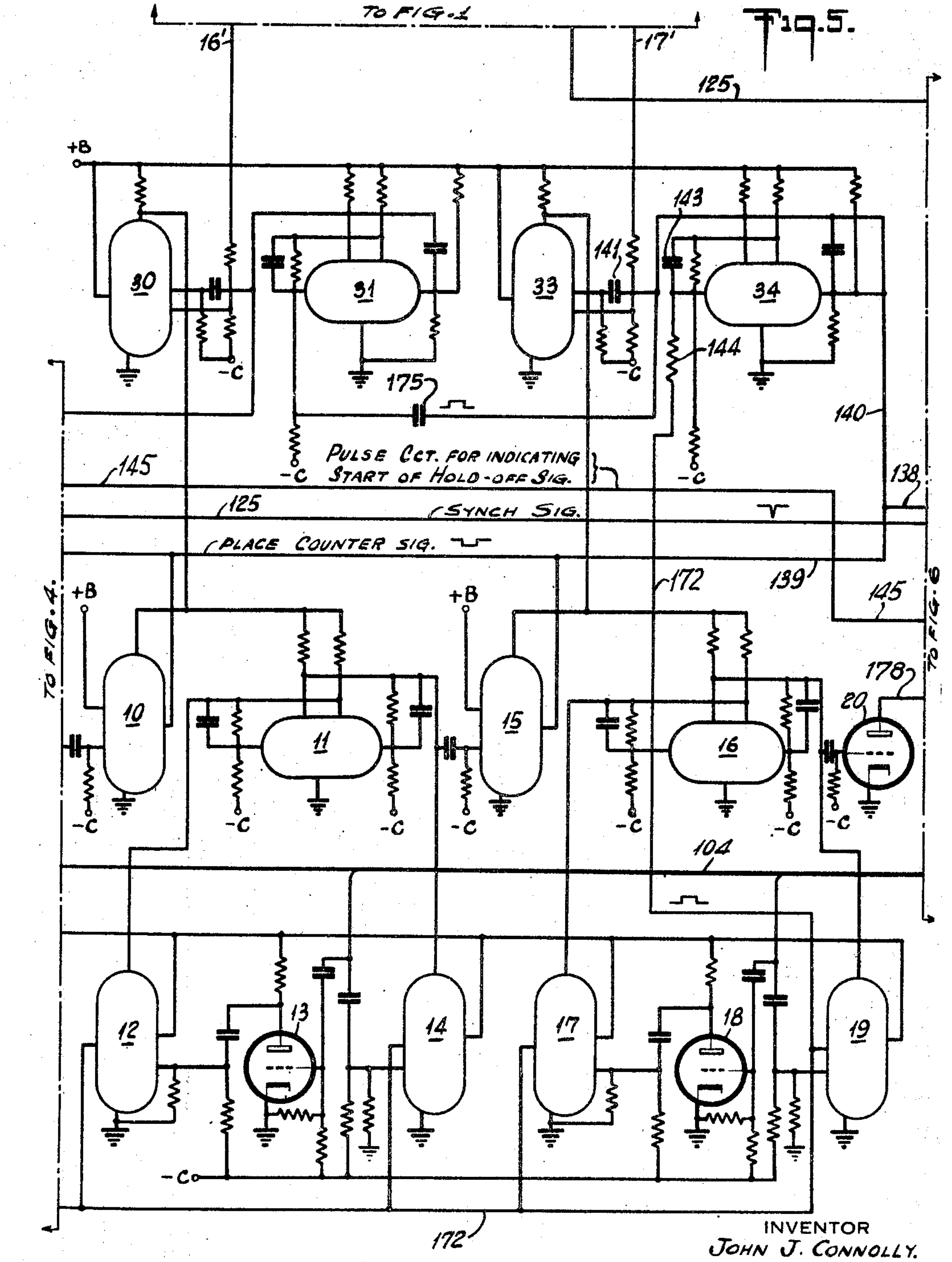

As before stated, the four recording tracks for data storage are continuously scanned during every revolution of the drum, but during a single revolution their effects are utilized only once for every 16 recording spots that are scanned. In order to accomplish the skip-selection of data readings, I have provided a system of electronic gates 2, 4, 7, 9, 12, 14, 17 and 19, as shown in Figs. 4 and 5. These gates are all alike and are preferably constituted as pentagrid tubes. They have each a cathode, an anode and five grids, of which the first and third are used as control grids, while the second and fourth are screen grids connected to a source of potential designated +B and the fifth grid is a conventional suppressor grid connected to the cathode. These gates are normally held non-conductive by a negative bias potential applied to their #1 grids and by an insufficiently high positive potential applied to their #3 grids. These gates are individually selected for actuation by positive control potentials applied simultaneously in the first and third grids.

Considering first the derivation of a positive pulse for application to the #3 grid in each of the above-mentioned gate tubes, attention is directed to the output from digit counter stage 48 of the "place counter" (Fig. 7). Binary digit $2^3$ registers "0" for eight consecutive synchronizing pulses and "1" for the next eight pulses. When this stage receives the 16th pulse it is triggered back to a "0" registration and delivers a positive pulse over conductor 173 to the #1 grid (not shown) in gate tube 62, which may be of the same type as tube 24.

Gate 62 is normally responsive to such a pulse, but during a portion of the "gap interval" of drum rotation this gate is held non-conductive by a blocking potential applied to its #3 grid (not shown) through conductor 174. The blocking action spans a short time interval in which a positive gating pulse is delivered by the one-shot multivibrator 44 and is caused to time the transfer of a binary number from the revolution counter to the place counter, as above described. So, during the period when a carry-pulse might trip the digit counter stage 48, and before the commencement of scanning the record tracks, gate 62 will not be sensitive to a positive pulse in conductor 173, but otherwise it will respond whenever the binary place counter registration goes from 1111 to 0000.

When gate tube 62 becomes conductive, it transmits a negative pulse through capacitor 137 and conductors 138 and 140 to the right hand control grid (not shown) in a one-shot multivibrator tube 34, causing trigger action therein which blocks its right hand triode section. An immediate effect is to deliver a positive pulse through capacitor 143, resistor 144 and conductor 172, leading to all of the #3 grids in gate tubes 2, 4, 7, 9, 12, 14, 17 and 19, thus conditioning these tubes for response to the reading of one data signal at a selected one of each 16 synchronizing pulses.

*Electronic storage of the data signals*

The data signal readings result in a translation of the magnetic recordings into momentary electronic storage of the data. Flip-flop stages 1, 6, 11 and 16 are then set to a binary number corresponding to the magnetically stored data signal. The setting function is performed by selective operation of gate tubes 2, 4, 7, 9, 12, 14, 17 and 19. Grid #1 in each of the tubes 4, 9, 14 and 19 is coupled to a respective one of the output circuits from the reading heads of the magnetic drum, these circuits being gathered into cable 104. It may be assumed in passing that the reading heads would not be directly connected to these grids since amplification might be necessary, and, therefore, the use of amplifiers in the circuits between the reading heads and the tubes may be resorted to without departing from the scope of the invention.

The pulse delivered at any reading point will be either positive or negative, according to the character code element recorded at that point. If it is assumed that gate tubes 4, 9, 14 and 19 respond only to positive pulses, then it is necessary to duplicate these gating tubes in order to obtain a response to negative pulses. Tubes 2, 7, 12 and 17 fulfill this requirement. For their control it is required that phase inverter stages be used. These are shown as triode tubes 3, 8, 13 and 18. The control grids of these tubes are likewise coupled to different ones of the four conductors in cable 104. The grids are so biased that these inverter tubes are normally conductive but may be blocked by a negative signal from the reading heads. When selected to be blocked, they severally cause a positive signal to be applied to the first grid of an associated tube of the group 2, 7, 12 and 17.

The anodes in gate tubes 2, 7, 12 and 17 are connected respectively to right hand anodes in tubes 1, 6, 11 and 16, while the left hand anodes of the latter are connected in the same manner to anodes in gate tubes 4, 9, 14 and 19. Selective operation of the gate tubes results in a storage of data signals in tubes 1, 6, 11 and 16. As shown in the preceding chapter this gating action takes place only when the #3 grid in each of the tubes 2, 4, 7, 9, 12, 14, 17 and 19 is driven positive by a signal from the gate 62.

When the gates 2, 4, 7, 9, 12, 14, 17 and 19 are simultaneously conditioned by the positive pulse applied to conductor 172, and also from either a positive or negative reading pulse, it will be seen that either the left hand gate or the right hand gate of the pairs shown in Figs. 4 and 5 will exercise control upon associated tubes 1, 6, 11 and 16, and set these tubes to store the code representing a given data item as read out from the magnetic drum. The storage of this code signal is for the purpose of identifying the character which has been stored and which is to be manifested as a character display. All that is accomplished by the temporary storage of this data code signal is to set the flip-flop tubes 1, 6, 11 and 16 to a certain count corresponding to the identification of the data item. This count is thereupon carried forward to the count of 16 in response to synchronizing signals applied to tube 1. The purpose of this counting is to selectively phase the skip-selection process in respect to the use of the mosaic element readings so that a character corresponding to a translated data signal shall be properly delineated.

After transfer of the data code signal into storage tubes 1, 6, 11 and 16, these tubes are caused to operate as a computer. They add to the binary number representing the data code a number which is the complement of the synchronizing pulse count that stands in tubes 23, 26, 29 and 32 at the instant when gate 62 operates. The computing process is as follows:

Twin triode tubes 25, 28, 31 and 34 are one-shot multivibrators and they are concatenated so as to operate successively, but in reverse order. Their time constants are of the order of a very few microseconds, so that all four of them will complete their cycles within less than the time lapse between two synchronizing pulses. They will henceforth be referred to as delay tubes.

Delay tube 34 triggers in response to a negative pulse from the place counter gate 62. Its right hand triode section when blocked produces a positive pulse, as before stated, for gating the data code signal into the storage tubes 1, 6, 11 and 16. The negative pulse from gate 62 is at the same time applied to grid #3 in each of three gate tubes, 5, 10 and 15 thereby causing these tubes to be blocked.

While gates 5, 10 and 15 are blocked there can be no accumulation of the synchronizing pulse count in tubes 6, 11 and 16. Furthermore, the computing process which I am about to describe is completed within the time interval between two synchronizing pulses, the first of which precedes the transfer of the data signals to tubes 1, 6, 11 and 16. So it is unnecessary to isolate tube 1 from the synchronizing signal.

When delay tube 34 restores itself, the left hand anode therein delivers a positive pulse through capacitor 141 to the #3 grid in gate tube 33 and conditions this gate to accept a control pulse from counting tube 32, dependent upon the setting of the latter to represent binary numeral "0" or "1." Such a control pulse is derived from the left hand anode of tube 32 and transmitted through conductor 17'. The pulse is highly positive if the numeral happens to be "0," because the "gap reset pulse" previously transmitted over conductor 124 was negative and caused all counting tubes to be reset to zero (that is, with their left triode sections blocked) during the "gap" time.

If the gate 33 becomes conductive, its lowered anode potential is effective as a blocking bias on one of the grids in tube 16. So tube 16 will be triggered, no matter which way it had been set to store its digit representation of the data signal. The effect is to add the complement of "0" which is "1" to the binary digit $3^3$ as stored in tube 16. During this transfer operation the gate 15 is rendered insensitive to control because of its lowered anode potential. If numeral "1" is registered in counting stage 32 when the delay interval of tube 34 is completed, then, because the complement of "1" is "0," there will be no addition of a unit in counting stage 16.

The second stage of the computing process is initiated when delay tube 31 is triggered by a positive pulse transmitted through capacitor 175 to its left hand grid. Delay tube 31 restores itself quickly, and conditions gate 30 to respond to a positive pulse (representing the complement of "0") derived from a blocked state on the left side of counting tube 29, as when "1" is to be added to the binary digit stored in tube 11. If the pulse from tube 29 happens to be of low positive value, then no computing action is called for and none takes place.

The third and fourth of the computing stages are performed in the same manner as above described. Delay tube 28 is triggered by a pulse through capacitor 176 when tube 31 restores itself. Gate tube 27 transfers the binary numeral for the complement of "0" stored in tube 26 and this transfer is reflected in a triggering of tube 6 under that condition or the failure to trigger it if "1" was stored in tube 26.

The computing process is completed by triggering delay tube 25 when delay tube 28 restores itself, and then conditioning gate tube 24 to transmit or not to transmit a pulse to digit counter stage 1. The reason for step-by-step transfer of the binary digits from counter tubes 32, 29, 26 and 23 to tubes 16, 11, 6 and 1 respectively is to avoid conflict between times of triggering these last mentioned tubes on the one hand, and times of transferring carry pulses from one to another of the same tubes.

*The synchronizing pulse "hold-off" period*

It was indicated above that a negative pulse derived from gate 62 is coextensive with the duration of the momentarily triggered condition of the delay tube 34 and results in the disablement of the gates 5, 10 and 15. Tube 1, which counts synchronizing pulses in the units place of binary digits in response to signals delivered over conductor 125 from the output of tube 43 cannot, however, exercise control over tube 6 and further counting stages 11 and 16 until permitted to do so by restoring the high positive potential to the #3 grids in tubes 5, 10 and 15. So when delay tube 34 restores itself to normal right hand side conduction, that is, with its left hand anode at high positive potential, the synchronizing pulses are thereafter counted in tubes 1, 6, 11 and 16. However, the progressive count starts with whatever number has been stored in tubes 1, 6, 11 and 16 as the sum of a binary number representing the data code signal, and the binary number representing the count of revolution pairs of the drum which is reflected in the phasing of the place counter signal.

Since there are four stages in the count 1, 6, 11 and 16, the synchronizing pulses are counted no further than 16 and at that point their cycle again commences at zero. The 16th or zero count is responded to in a triode tube 20 when tube 16 is so triggered as to have a high potential on its left side. Thereafter, the counting chain 1, 6, 11 and 16 will continue to count from zero to 16 until the end of the synchronizing pulse train is reached. Thus, a negative "16th-pulse" is caused to be delivered to a flip-flop tube 21 as a result of rendering tube 20 conductive. This pulse defines the termination of the "hold-off" period. The commencement of the "hold-off" period is coincident with the triggering of tube 34, one of the effects of which is to trigger a delay tube 38, as will now be explained.

Tube 38 is normally conductive on the right hand side. It receives a positive pulse on its left side grid through capacitor 143 and resistor 144, the circuit being then traced through conductor 145.

When the delay tube 38 responds to this pulse, its right hand anode rises to substantially the +B potential causing a pulse to be delivered through capacitor 146 to the grid of a normally non-conductive triode 39. Until tube 38 becomes automatically restored to its normally conductive state on the right hand side, tube 39 will be conductive and will deliver a negative pulse to the left hand grid in tube 21 for blocking the left hand triode section therein, thus defining the commencement of the "hold-off" period.

*The effect produced by the "hold-off" period*

The coordination to be obtained between the moments of reading data signals and the moments of reading mosaic signals, by way of translation of the said data signals, is illustrated in Figs. 8a, 8b and 8c. The time diagram shown in Fig. 8a covers three revolutions of the drum. In each of these revolutions there is a synchronizing pulse train to be scanned in which there are 1024 magnetized spots following a gap. A division of these magnetized spots into 64 groups, having 16 spots in each group, provides the basis for operation of the skip-selection process which is required in order to suitably select different mosaic patterns which will translate the coded information of the data items into character displays.

According to the present form of my invention, data readings are obtained during even numbered revolutions of the drum, while mosaic pattern readings are applied to the cathode ray tubes during odd numbered revolutions of the drum.

Considering the first revolution of the drum, and considering the first series of 16 synchronizing pulses as the first group of such pulses, only one synchronizing pulse in this group will be made effective for selecting a data signal to be read. There are, however, 63 further synchronizing pulse groups in each of which a data signal will be selected, so that during each even numbered revolution of the drum 64 data signals will be read and translated. During the entire progress of the first revolution (0-count being represented by the first synchronizing pulse) it may be assumed that only the 15th synchronizing pulse position in each of the 64 pulse groups will control the selection and effectiveness of a data signal. The same will be true of the15th pulse in each of the other 63 pulse groups.

At the start of the second pair of revolutions, the revolution counter will reset the synchronizing pulse counter so that only the 14th pulse in each of the 64 pulse groups will be effective to obtain a data signal translation. During even numbered revolutions of succeeding pairs different data signals will be selected for translation, but always spaced apart by exactly 16 synchronizing pulses.

Referring to Fig. 8*b*, I show four time diagrams therein where a receding position of translation of data signals is illustrated. The time scale is enlarged with respect to that of Fig. 8*a* so that the position of a single pulse in each group of 16 pulses is indicated. The output from gate 62 has been explained as an integrated negative pulse. It has also been explained that this output occurs only once during each period of 16 synchronizing pulses. The effect of the revolution counter is to cause a recession of time of pulse delivery by gate 62 with respect to the synchronizing pulses as counted from the start of the pulse train—or in other words, from the gap. After the 32nd revolution of the drum the cycle of retrograde steps for positioning the output signals from gate 62 with respect to the synchronizing pulse train is completed and the cycle itself is repeated as before, and continuously.

In Fig. 8*c*, I show two linear time scales, the upper one of which represents moments of reading data signals during the 12th revolution of the drum, while the lower of the two time scales represents such a reading of data on the 14th revolution of the drum. The output from gate 62 is indicated for different groups of 16 synchronizing pulses at points *u*, *w* and *y*. For the 14th revolution similar pulses are obtained from gate 62 at points *v*, *x* and *z*. It should be understood from the foregoing description that, while the reading position for stored data must be shifted in time so as to cover the different data storage positions in each group of 16, there is no corresponding shift in the reading positions for different mosaic patterns. If, therefore, a data signal is to be read at point *u* on the 12th revolution, and if this data signal is to be translated into a character representation, say for the numeral "6," a certain time interval must be taken into consideration between the reading of the data signal and the reading of the first mosaic block of the corresponding character for numeral "6," such as may be indicated by the dimension line *q*. In the time scale of Fig. 8 this dimension *q* is equal to 6 synchronizing pulses. Six synchronizing pulses will be the measure of the "hold-off" period as reflected in the operation of tube 21.

Assuming now that the character which is read at *v* on the 14th revolution is the same character "6" which was read at point *u*, it will be clear that the same mosaic pattern must be read and must be started at the same point as before, but with a longer "hold-off" period in the operation of tube 21. This period having a time dimension *r* in Fig. 8*c* is one pulse longer than the period represented by time dimension *q*.

When the reading of a mosaic pattern is properly started for interpretation of the decoded data signal, it will presently be shown that every 16th pulse following the starting pulse for the mosaic reading will carry this mosaic reading through a complete cycle, regardless of the particular mosaic block which is selected for the start of the scanning operation. The hold-off voltage may vary in duration anywhere from 1 to 16 pulses, but the starting point, when properly phased for the desired translation of the data signal, is all that is needed in order to maintain correct selection of all the other mosaic block signals necessary to completely delineate any character.

Referring now to reading points *w* and *x* for different signals in a 16-pulse-group following the reading of signals *u* and *v* for different revolutions, let it be assumed that the reading points *w* in the 12th revolution, and *x* in the 14th revolution result in the translation of different characters because of the difference in the data codes which are recorded in these positions. If a translation of a code at recording point *w* indicates that the numeral "3" was there recorded, the proper selection of a mosaic pattern may be indicated by the dimension *s* between the reading point of the data signal and the necessary reading point of the first mosaic block in the reading of the mosaic pattern. The hold-off voltage will then have a time duration represented by the dimension *s*. Now let the translation of the data code at point *x* be assumed to be for the display of the numeral "9." The duration of the hold-off voltage represented by the dimension *t* will be the resultant of two effects; one being the setting of the place counter in response to the count of revolutions up to the 14th, and the other effect being that which is obtained by the translation itself of the data signal into a selection of the starting point for its corresponding mosaic pattern in order to delineate the numeral "9."

*The crystal matrix*

The crystal matrix 69 (Fig. 7) is of conventional type. It comprises preferably a plurality of crystal diodes as used for obtaining a unilateral conductance through a selected one of numerous branch circuits, where input potentials applied to the matrix from various points simultaneously, and according to variations of coding, will result in there being one, and one only, conductive path through the matrix to a selected one of numerous output circuits. Since the matrix which I have found useful in carrying out my invention is well-known in the art, I have shown it as a unit and as a block 69, which is to be controlled, according to the instant embodiment of my invention, by six electronic counter stages 63 to 68 inclusive. Each of these counter stages consists, preferably, of a flip-flop tube and associated circuit arrangement so that six digits of a binary number may be set up therein. The counting chain as a whole may go through a progression of counting from 0 to 63 and repeat. Each counting cycle is to be initiated by an output pulse from the gate 62. Referring to Fig. 8a, it will be seen that each of the 64 synchronous pulse groups of 16 pulses each are covered during a single revolution of the drum. During each revolution, however, it is provided that each of the 64 cathode ray tubes 115 shall be activated, and each of these tubes will be successively conditioned for displaying a character according to a translation of data signals, as previously described.

*Cooperation between the matrix and the "hold-off" timing means*

Digit counter 63, representing the binary unit $2^0$, is controlled by a negative pulse delivered by the gate 62, which pulse has heretofore been referred to as the "place counter signal." Digit counter stages for binary numerals $2^1$ $2^2$ $2^3$ $2^4$ $2^5$ are concatenated in order to build up the count of "place counter signals" from 0 to 63. The setting of the flip-flop tubes in these digit counters is held for each group of 16 synchronizing pulses, and during each of these 16-pulse periods a different one of the cathode ray tubes 115 in display units 119 is rendered operative. Cable 147, therefore, includes 64 conductors each leading to a gate tube 148 and to the #1 control grid therein. In the presence of a positive potential derived from the crystal matrix 69, different ones of the tubes 148, which are associated with the several cathode ray tubes 115, will be conditioned for response to the positive "hold-off" voltage which is derived from a conductive state in cathode follower tube 22 during the "hold-off" interval. The purpose of tube 148 is produce a variable delay in the starting of a pulse counting process that is performed by tubes 157 and 158 in each of the units 119. That counting process is what provides the skip-selection of mosaic signals and results in the proper delineation of characters on the cathode ray tubes.

Now to resume a discussion of the device for variable timing of the "hold-off" voltage, as was made in a previous part of a description, this device requires further explanation of its cooperation with the matrix. The "hold-off" timing means may be defined as a device for measuring a variable time interval starting with the first synchronizing pulse that follows the place counter signal and ending with the moment when the counting chain tubes 1, 6, 11 and 16 are reset to represent the binary number 0000.

Twin triode flip-flop tube 21 is triggered for conductance in its right hand triode section during the "hold-off" period. The place counter signal, as before explained, causes a successive tripping of the delay tubes 34, 31, 28 and 25, so that when tube 25 restores itself a positive pulse is generated in conductor 145 for triggering the left hand section of tube 38, which section is normally biased to cut-off. Tube 38 is a delay tube which restores itself after performing its function of impressing a positive pulse across capacitor 146 and through a grid resistor 177 to a —C biasing source. The control grid of a normally blocked triode tube 39 is thus excited and causes tube 39 to become conductive until tube 38 restores itself. The reduced anode potential in tube 39 causes tube 21 to be triggered at the start of the "hold-off" period. Tube 21 therefore remains blocked in its left hand triode section, thereby developing a positive bias on the control grid in its right hand triode section, and also on the control grid in cathode follower tube 22. The control circuit referred to in the preceding sentence has a capacitor 151 in parallel with a resistor 152, both connected between the left hand anode of tube 21 and its right hand grid. The two grid bias resistors 153 are separately connected between the —C source and the respective grids of tube 21.

At the termination of the "hold-off" period tube 21 is triggered for conductance on its left side so as to restore the blocked condition on its right side, and also in the cathode follower tube 22. The control applied at this time is derived from the operation of tube 20 which is rendered conductive when said binary number 0000 appears in the counting chain tubes 1, 6, 11 and 16. At this moment tube 20 becomes conductive and delivers a negative pulse through conductor 178 and through resistors 152 and 153 to the —C source. The right hand grid in tube 21 and the grid in tube 22 are then both driven negative. Thus conduction in tube 22 is caused to cease. During the "hold-off" period, therefore, the relatively positive cathode potential in tube 22 provides the positive "hold-off" voltage which has been referred to above as being effective to control one of the gate tubes 148, depending upon which of these tubes is otherwise conditioned for conduction by the matrix 69.

*The synchronizing pulse counter in each of the units 119*

The purpose of tube 157 is to rectify the synchronizing pulses and to apply positive half-cycles of the same to the grid of a blocking oscillator tube 158. This tube is normally biased far below cut-off. It has circuit parameters so arranged that it will be driven conductive only after a step-by-step increase of its grid potential to a substantially zero bias.

The twin diode tube 157 has its right-hand cathode coupled to ground through capacitor 159. Its right hand anode and its left hand cathode are inter-connected and both are coupled through capacitor 160 to conductor 125 whereon the synchronizing signal is applied as output from tube 43. The left hand anode of tube 157 is connected to a movable tap 163 on a potentiometer in circuit between ground and the +B terminal.

Tube 148 has no anode potential applied to it except that which is derived from the rectification in tube 157 of the synchronizing pulses, although a steady positive screen voltage is obtained from the +B terminal.

The successive switching of controls from one to another cathode ray tube display unit 119 takes place at the starting moment of counting each pulse of output from the place counter gate 62, which is at one-sixteenth the synchronizing pulse rate. The "hold-off" period also starts at substantially the same instant as the transfer of control from one to another unit 119.

A conductive state in tube 148 disables the synchronizing function of the blocking oscillator. This is because tube 148 offers a low impedance path to ground for pulses that pass through the right hand diode section of tube 157. So no charge is built up in capacitor 159 sufficiently to elevate the bias on the grid of tube 158. But when tube 148 becomes blocked at the end of the "hold-off" period the count of successive groups of 16 synchronizing pulses is started and on every 16th pulse tube 158 is triggered and offers a discharge path for capacitor 159.

The windings of transformer 164 are so poled as to greatly increase the flow of grid current in tube 158 when the latter is driven conductive. A surge impulse through capacitor 165 and resistor 166 then drives the cathode of the cathode ray tube 115 sufficiently negative to emit a beam. The concurrent mosaic signal applied to the grid of the cathode ray tube through conductor 169 is then made effective to produce a black or white spot for this portion of the selected character delineation.

*Adjustment of circuit parameters for blocking oscillator 158*

At the end of the "hold-off" period a succession of synchronizing pulse half-cycles causes a charge to be built up in capacitor 159. The count commences with a condition in which the grid of tube 158 is set at a fixed negative bias with respect to the cathode of this tube. Let it be assumed, for example, that the grid stands at +50 volts and that the cathode stands at +100 volts due to the setting of potentiometer taps 162 and 163 respectively on two series-connected potentiometers as shown in circuit between the +B source and ground.

Capacitor 159 has a value such that, in association with the other components of the circuit, it will build up a charge of accumulated half-cycles of the synchronizing pulse train during a period of 16 such pulses, and at the end of this period the grid potential in tube 158 will rise substantially to the potential of the cathode and cause this tube to conduct. As soon as the tube begins to conduct the feed-back through transformer 164 drives the grid potential more and more positive so that saturation is obtained and there is a heavy flow of grid current which results in the discharge of capacitor 159. Immediately following this operation the grid in tube 158 is automatically biased to cut-off so that a subsequent group of 16 synchronizing pulses may be counted.

The adjustment of potentiometer taps 160 and 161 is necessary in order that there shall be the same starting bias level for the grid in tube 158 under two different conditions (1) at the end of the "hold-off" period when tube 148 becomes blocked, and (2) on the initiation of subsequent counts of the 16 synchronizing pulses which follow successive discharges of capacitor 159 and until a full revolution of the drum has been completed, measuring from the point where the mosaic signal track is first picked up.

*Why 32 drum revolutions for the complete scanning program*

Only in the instant embodiment of my invention as herein shown and described is it necessary to prolong the scanning cycle throughout the period of 32 drum revolutions. I could have adopted a program of operation which would have a scanning cycle of only 16 drum revolutions and still would have utilized all of 16 character spaces on the face of each of the 64 cathode ray tubes, and at the same time would utilize all of the 1024 storage spaces for data signals. I did not show such an arrangement because it would have involved a certain amount of duplication of the common equipment.

The reason for devoting an entire drum revolution to the scanning of data signals, while holding in abeyance until the following revolution the effective scanning of the mosaic pattern record, is this: the first group of 16 synchronizing pulses following the scanning of the gap allows for selection of one data signal and for the definition of the "hold-off" period, which represents the interpretation of that signal. The selection of one of the interlaced mosaic patterns must of necessity follow the definition of the "hold-off" signal. When the first block of the mosaic pattern has been selected the cadence of further selection of all the mosaic blocks permits the portrayal of the selected character only up to the completion of a revolution of the drum. So if a data signal is to be read at the halfway point of the revolution of the drum the mosaic pattern has already been half scanned. The first half would, therefore, be lost if at the end of a single revolution of the drum the placement biases (as shown in Fig. 9) would shift further portrayal of the character into a position on the cathode ray screen where it does not belong.

When the horizontal and vertical placement effects are applied to the output from the sweep circuit generators 71 and 73 with shifts only on completion of each pair of drum revolutions, it will be seen that any "hold-off" signal which has been defined during the first revolution of the pair may be made effective in the selection of a mosaic pattern to be used in the second revolution of the pair and throughout that complete revolution.

It should be noted that the pulse counting cycle as carried on in each of the units 119 goes on automatically commencing at the termination of each "hold-off" period, and until a new "hold-off" period is applied. Furthermore, the actual spotting of every 16th pulse for the sake of proper mosaic pattern selection is not disturbed during transition from an even-numbered revolution to an odd-numbered revolution because during the scanning of the gap there is no synchronizing pulse record to be scanned. This should make it clear that the effect produced by the "hold-off" voltage is carried over from an even-numbered revolution to an odd-numbered revolution without loss of its meaning.

In an alternative embodiment of my invention which would require some duplication of equipment the data signals which are read during the first half of one drum revolution may be applied for portrayal of the mosaic pattern during the second half of the same revolution. Then the data signals which are read in the second half of a revolution would be made effective in character portrayal by control of the mosaic record track during the first half of the succeeding revolution. This method is entirely feasible when one considers that character formation is quite legible if the mosaic blocks of the pattern are limited to eight horizontal lines with four blocks in each line. I have allowed for twice as many mosaic spot records around the circumference of the drum and have previously stated that I would repeat the black or white significance of each mosaic block signal for each of 32 blocks, so as to spread the mosaic scanning time uniformly throughout one revolution of the drum. When limiting the scanning time to a half revolution there would be no loss of definition in the character formation.

If the character spaces on the face of each cathode ray tube were to be limited to eight, or if the number of cathode ray tubes were to be limited to thirty-two, it might then be possible to repeat the scanning cycle every 16 drum revolutions. In this case, however, the storage space for data signals would not be utilized to its full capacity. These explanations are here given in order to point out the possibilities for modification of my invention without departing from the spirit thereof.

*Portrayal of characters by the mosaic signal*

It may be well to make further explanation of that feature of my invention which has to do with the selection of mosaic block signals corresponding to any character which is decoded and read out from the data storage tracks. The operation of the system is such that once a mosaic block signal has been selected all the other mosaic block signals for a selected character will be impressed upon the grid of a cathode ray tube in accordance with the skip-selection of a certain synchronizing signal, or mosaic block signal which is one only of every sixteen that are scanned. This feature should be clearly understood as one which enables me to correctly apply the character portrayal process to each of the cathode ray tubes and to portray different characters, or the same character, in different tubes during a single revolution of the drum, also in different places on each of the cathode ray tube screens during successive revolutions of the drum. The blocking oscillator 158 has a time cycle such that it operates once for every 16 synchronizing pulses. The cadence of operation enables suitable mosaic block signals to be selected in accordance with the first of them to be selected at the end of the "hold-off" period.

As different cathode ray tubes 115 in display units 119 are selected by the crystal matrix 69 different translations of data code signals are each caused to deliver a "hold-off" signal to one of the tubes 148 and thus to deactivate the counting function of the associated tubes 157 and 158 and capacitor 159 until the arrival of the proper starting time for counting the series of sixteen synchronizing signals. Unless tube 158 is triggered so as to reduce its anode potential, the cathode in the associated cathode ray tube 115 will not be driven sufficiently negative to emit the electronic beam. So the mosaic signals will have no effect except when they are skip-selected.

The function of the revolution counter, in its control of the place counter, has been explained above as one which, among other things, has a variable effect upon the sweep circuit of the cathode ray tubes so as to confine the scanning action to a single character portrayal area which is one of sixteen such areas on the screen of the cathode ray tube. It should be remembered now that a different series of data signals is translated with each succeeding one of sixteen even numbered revolutions of the magnetic drum. Hence, after thirty-two revolutions of the drum, the entire screen of each cathode ray tube is scanned and character area after character area is covered with portrayals of the data signal translations. The individual mosaic blocks are selected on the recurrence of every sixteenth synchronizing pulse. The selection cadence is suitably phased by each of the data signal translations as applied to the "hold-off" voltage. The operation is repeated for every group of sixteen pairs of magnetic drum revolutions.

The embodiment of my invention herein illustrated provides for the storage of 1024 data code signals around the circumference of the drum. These signals are to be read on even numbered revolutions. The skip-selection process of reading requires 32 revolutions of the drum for a complete scanning cycle to be completed. If it be assumed that the drum is driven at a speed of 1200 R. P. M., which is 20 revolutions per second, then 32 revolutions will require 1.6 seconds, which will be the repetition rate for portrayal of each character on the cathode ray tube screens.

In order to avoid objectionable flicker when the scanning cycle is so prolonged as above indicated, for example, the fluorescent material used on the cathode ray tubes must have a very long decay period. Under similar operating conditions satisfactory results have been achieved in practice. Variations of the speed of the drum may, of course, be made in different designs of my apparatus, and numerical variations of the recording spaces on the drum may be arranged for without departing from the spirit of the invention.

*Illustration of operation*

In the preceding description I have taken different chapters for focusing attention on different components of the entire system. An overall survey of the operating characteristics will now be given.

Let it be assumed that with the magnetic recordings made on the four data signal tracks, and in 1024 linear recording spot areas of said tracks, different numerical items are recorded in 4-unit code. These codes when read and translated by gating the code signals into tubes 1, 6, 11 and 16 provide the means for measuring the "hold-off" signal so as to start the counting of 16 synchronizing pulses in selected phase relations to the "gap" signal so as to trigger tube 158 at selected times within each groups of 16 pulses throughout one revolution of the drum. There are 64 groups of 16 pulses, as defined by the reading of the synchronizing pulse train. There are, therefore, 64 available recording positions for each of the mosaic block patterns. In each group of 16 successive mosaic recording spots a single block of the mosaic pattern for a single character is represented.

As a practical matter it is found that any of the numerals and any of the alphabetical characters may be fairly well formed by suitable arrangements of mosaic blocks "black and white" where only four blocks are spread along each of eight horizontal rows, making a total of 32 blocks. In one embodiment of my invention, however, it is contemplated that the horizontal scanning cycle shall be commensurate with 128 synchronizing pulses. Where the interlaced mosaic patterns are to be selected so that only one mosaic spot recording is read for every 16 that are scanned, this means that we must have two scanning positions for each of the 32 blocks of the character delineation. These two scanning positions may be taken in immediate succession; that is, the first scanning in one group of 16 synchronizing pulses, and the second scanning in the next group. This would tend to broaden the base of each mosaic block. The mosaic patterns, for different characters may be arranged to cover only half a revolution of the drum and be repeated during a second half revolution. This alternative arrangement would also require that the vertical scanning cycle be completed during each half revolution of the drum, and that the vertical saw-tooth wave be generated at twice the revolution frequency of the drum.

It was pointed out in a preceding part of the description that differently selected portions of the data storage record are scanned and translated in different even-numbered revolutions of the drum, and that the place counter signal as applied to the closing of gates 5, 10 and 15 results in a disablement of the counting chain including tubes 1, 6, 11 and 16, until the data signal has been read into these tubes, and also until after the count of revolutions then standing in tubes 23, 26, 29 and 32 has been transferred to tubes 1, 6, 11 and 16 for addition of the complement of the revolution count to the numerical equivalent of the code signal. The foregoing description also mentioned the fact that delay circuits 34, 31, 28 and 25 have to be triggered progressively, each by the preceding one and in the order named, so that the transfer of count from tubes 32, 29, 26 and 23 to the tubes 16, 11, 6 and 1 respectively, shall not result in a conflict of controls by the transfer operation on the one hand, and by carry operations from one binary stage to a higher order stage.

The blocking effect upon the gates 5, 10 and 15 to prevent carry operations is of very brief duration and is shorter than the synchronizing pulse cycle, being the order of just a few microseconds.

The operation of injecting a data signal into the electronic counter 1, 6, 11 and 16 is followed by an injection therein of the revolution count. Then the counter itself progresses from that initial setting to the count of 16 under control of the synchronizing pulses. On the 16th count, tube 20 is rendered conductive and terminates the period of the "hold-off" voltage which was commenced at the moment of occurrence of the place counter signal, as delivered by gate 62.

Upon reference to Fig. 8c it should be clear that the duration of the "hold-off" voltage is resultant from taking two factors into consideration; one being the translation of the code signal so as to select a proper starting point for the mosaic pattern reading, and the other being the effect of counting the revolutions of the drum.

With each scanning of the linear record tracks corresponding to 16 synchronizing pulses, a different character code is translated and causes the length of the "hold-off" period to be determined. When the same character is translated in succeeding revolutions of the drum this "hold-off" period will be lengthened by one synchronizing pulse. There are, therefore, 64 different groups of 16 pulses in which a single data signal is read and translated during one revolution of the drum—so that the process of determining the duration of the "hold-off" period is reported 64 times in each even-numbered revolution. Each of the 64 data signal translations is coincident with the selection of a different cathode ray tube unit 119 for display of the translated character.

During a single revolution of the drum all of the cathode ray tubes will have their sweep circuits confined to the area in which a single character is portrayed. Thus for revolution #1 the character area #1 (Fig. 10) will receive the mosaic pattern signals because the place counter has applied to the sweep circuits suitable fixed bias potentials for causing the saw-tooth waves from the sweep circuit generators to be restricted in that manner.

On the #2 revolution of the drum 64 new readings of data signals will be obtained, each of which will be translated into a suitable "hold-off" period as applied to different cathode ray tube units 119 so that these characters will be portrayed in the area #2 which is the second area along the top horizontal line of the cathode ray tube screens. Assuming that the decay period of the fluorescent material on the cathode ray tube screens is sufficiently long to maintain the portrayed images in each character-representing block on the screen, it will be evident that the display of as many as 16 characters on each of 64 cathode ray tubes may be maintained continuously. With suitable application of new recordings to the magnetic drum in accordance with well-known techniques, and while the drum revolves continuously, it is possible to change the display of characters wherever needed in the entire array of character blocks and in each cathode ray tube.

It will be apparent to those skilled in the art that even though the foregoing description is restricted to a specific embodiment, my invention is capable of many different modifications. The principles of my invention are sufficiently illustrated by this one example. The description should not, therefore, be considered a limitation on the scope of my invention.

I claim:

1. Graphic display apparatus comprising a cathode ray tube and control circuits operably coupled to its electrodes, a source of keyed signals representing interlaced mosaic patterns for selective character delineation, said source being coupled to one of said electrodes, a blocking oscillator coupled to another of said electrodes, an electronic counter repetitively operable at a synchronizing pulse frequency and serving to trip said oscillator into action periodically, the tripping rate being commensurate with a fixed number of synchronizing pulses, and means controlled by the development of a "hold-off" signal for selecting a predetermined synchronizing pulse which is effective in the initiation of the repetitive pulse counting process by said counter, thereby to cause said blocking oscillator to be tripped in phase with discrete mosaic block signals of a single one of said interlaced patterns, so that a selected character may be delineated on the screen of said cathode ray tube.

2. In combination, a continuously rotatable magnetic data storage device having record tracks for coded data, a record track for producing periodic synchronizing pulses, and a record track for interlaced patterns of mosaic block signals, reading heads operably positioned with respect to each of said record tracks, multiple display apparatus of the cathode ray tube type for manifesting character delineations, electronic gating means for translating different readings of the coded data into "hold-off" or waiting periods in accordance with which corresponding ones of said interlaced patterns are caused to be selected, each said period being an aliquot number of said synchronizing pulse periods, and means controlled by the effect of each said "hold-off" period for initiating a skip-selection process in the useful reading of said mosaic block signals, where each initiation of said process results in a continuing application of individual mosaic block signals during a scanning cycle sufficient for the spread of a character display on the screen of a cathode ray tube.

3. The combination according to claim 2, and including means for obtaining a skip-selection of useful readings of said coded data on the record tracks therefor.

4. The combination according to claim 2, and including means for causing different selected characters to be simultaneously displayed on respectively different cathode ray tube screen areas as a result of sequentially translating different permutations of data signals into different "hold-off" periods.

5. Graphic display apparatus of the type which spreads intelligence on the screens of cathode ray tubes, said apparatus comprising a rotary magnetic storage medium having record tracks for code signals which carry said intelligence, also having a record track for delivery of synchronizing pulses and a record track for interlaced mosaic patterns, each pattern being suitably composed for the representation of a different character, a plurality of said cathode ray tubes, saw-tooth wave sources of horizontal and vertical beam deflecting potentials common to the deflecting means of all said tubes, said sources being synchronized by said synchronizing pulses, a counter responsive to said pulses and having a fixed repeat cycle at one count of which it delivers a gating signal, means for variably presetting said counter on a selected count of the synchronizing pulse train, said means being responsive to the reading of a recorded code signal which carries an item of said intelligence, and gating means operable by a suitable timing of said gating signal for causing the beam in said cathode ray tube to spread a mosaic pattern which signifies the purport of a selected code signal as recorded and sensed.

6. Graphic display apparatus of the type described, comprising a plurality of cathode ray tube indicators each having an electron gun and coordinate beam deflectors, sweep-circuit control means common to the deflectors of a plurality of said indicators, a rotary magnetic pulse storage device having record tracks whereon there are recorded certain items of coded information and each item has an assigned linear location on said tracks according to its classification, a record track on said device for interlaced signals representing mosaic patterns, where each pattern is suited to the delineation of a character on any of said indicators, a record track on said device for synchronizing pulses, pick-up means for scanning all said record tracks, electronic counting means operable at the cadence of said synchronizing pulses for causing an allocation of effects of the pick-up means to different ones of said indicators or to different areas of their viewing screens, other counting means for obtaining a utilization of said pick-up means in respect to the scanning of said mosaic pattern track such that, by skip-selection, the elements of a chosen pattern are caused to be delineated on a given screen area, and gates for so controlling the emission from the electron guns in said indicators as to obtain a continuous display of characters on their screens corresponding to said coded information.

7. Apparatus as defined by claim 6 and including means operable during the continuous display of characters by said indicators for recording new items of information at selected points along the record tracks of said magnetic pulse storage device.

8. Apparatus as defined by claim 6 and including an electronic counter operable to count the revolutions of said magnetic storage device and means controlled by this counter for shifting the phase of operation of said pick-up means from revolution to revolution, thereby to obtain different skip-selections of said items of coded information in successive revolutions of said storage device.

9. Display apparatus for manifesting statistical items as stored in a continuously rotating data storage medium, comprising a record track on said medium having interlaced records of different mosaic patterns to be selectively utilized for portrayal of characters on the screens of cathode ray tubes, parallel record tracks whereon said statistical items are stored in coded form and different items are serially arranged in classified order linearly of the tracks, display means including a plurality of said cathode ray tubes, a circuit for supplying signals to the control electrodes in each of said cathode ray tubes, said signals being derived from a reading of said interlaced mosaic pattern records, means for periodically activating each of said tubes at a rate corresponding to the scanning of individual mosaic block records appropriate to any one of the interlaced patterns, means for starting that activation in different tubes successively, and means for phasing the activation starting time for each tube in accordance with a given translation of an appropriate one of the statistical items read from the statistical item record tracks so that the cadence of activation shall cause the utilization in a given tube of only those mosaic block records which will portray the character corresponding to the translated statistical item.

10. Display apparatus according to claim 9 and including means for causing a read-out of statistical items from said storage medium at a rate corresponding to the cadence of activation of said cathode ray tubes by way of response to the mosaic block signals.

11. Display apparatus according to claim 10 and including means for causing said read-out of statistical items and said activation of the tubes in response to the mosaic record signals to be performed at mutually exclusive times.

12. Display apparatus according to claim 9 and including means for shifting the phase of the statistical item read-out cadence on completion of each two revolutions of the storage medium, whereby different groups of items of the serial arrangement are caused to be translated during successive odd revolutions.

13. Display apparatus according to claim 9 and including means for concentrating the character portrayal process on different mutually exclusive areas of the cathode ray tube screens during successive even revolutions of said storage medium.

14. Graphic display apparatus comprising a plurality of cathode ray tubes, each having horizontal and vertical beam deflectors, a cathode control circuit and a grid control circuit having branches coupled to the cathode and to the control grid respectively in each of said tubes, a rotary magnetic storage device for coded intelligence which is to be graphically spread on the screens of said tubes, said device having a synchronizing pulse record path of limited length, a plurality of record paths for said coded intelligence, and a record path for deriving mark-space signals representative of a plurality of interlaced mosaic patterns, where the reading of each pattern serves to supply said signals to said grid control circuit for graphically displaying a different character, means common to said cathode ray tubes for controlling their beam deflectors in synchronous relation to the scanning of said synchronizing pulse record path, means for developing a skip-selection of synchronizing pulses whereby to obtain a reading effect from a single one of said interlaced mosaic patterns, said means comprising a blocking oscillator locked in step with pulses derived from said synchronizing pulse record path, and a gate jointly responsive (1) to pulses having a subharmonic relation to the frequency of said oscillator and (2) to a selecting signal individual to said given cathode ray tube, said gate being operable upon said cathode control circuit, and means for so controlling the phase relation of said skip-selection process as to produce a graphic display on a given cathode ray tube of a character represented by a particular item of said coded intelligence as read from the record paths for said intelligence.

15. Graphic display apparatus comprising a cathode ray tube and control circuits operably coupled to its electrodes, a source of keyed signals representing interlaced mosaic patterns for selective character delineation, said source being coupled to one of said electrodes, a phasing counter coupled to another of said electrodes, an electronic counter repetitively operable at a synchronizing pulse frequency and serving to phase said phasing counter periodically at a rate commensurate with a fixed number of synchronizing pulses, and means controlled by the development of a "hold-off" signal for selecting a predetermined synchronizing pulse which is effective in the initiation of the repetitive pulse counting process by said electronic counter, thereby to cause said phasing counter to be started in phase with discrete mosaic block signals of a single one of said interlaced patterns, so that a selected character may be delineated on the screen of said cathode ray tube.

16. Graphic display apparatus of the type which spreads intelligence on the screens of cathode ray tubes, said apparatus comprising a rotary magnetic storage medium having record tracks for code signals which carry said intelligence, and also having a record track for delivery of synchronizing pulses and a record track for mosaic patterns, each pattern being suitably composed for the representation of a different character, a plurality of said cathode ray tubes, sources of coordinate deflecting potentials for deflecting the beam of each of the cathode ray tubes to any desired position on the screen of the tube, said sources being synchronized by said synchronizing pulses, mosaic-pattern selecting devices respectively for said cathode ray tubes and adapted to store mosaic-selection signals, means for effecting translation of the said stored intelligence code signals into said mosaic-selection signals and applying them to said selecting devices, and means including said mosaic-pattern selecting devices and controlled by the translated mosaic-selection signals stored in the selecting devices for effecting the selection of any of a plurality of said magnetically-stored mosaic patterns to be displayed on selected areas of selected ones of the cathode ray tubes.

JOHN J. CONNOLLY.

REFERENCES CITED

The following references are of record in the file of this patent:

UNITED STATES PATENTS

| Number | Name | Date |
|---|---|---|
| 2,267,827 | Hubbard | Dec. 30, 1941 |
| 2,314,920 | Bumstead | Mar. 30, 1943 |
| 2,378,383 | Arndt | June 19, 1945 |
| 2,403,890 | Johnson | July 9, 1946 |
| 2,444,950 | Nichols | July 13, 1948 |

FOREIGN PATENTS

| Number | Country | Date |
|---|---|---|
| 621,752 | Great Britain | Apr. 19, 1949 |
| 621,872 | Great Britain | Apr. 21, 1949 |